Nov. 26, 1963 A. J. BREIVIK 3,112,038
METHOD AND APPARATUS FOR STACKING, HANDLING AND
BUNDLING ROD-SHAPED MATERIALS, ESPECIALLY
STRUCTURAL STEEL SHAPES
Filed Sept. 13, 1960 2 Sheets-Sheet 1
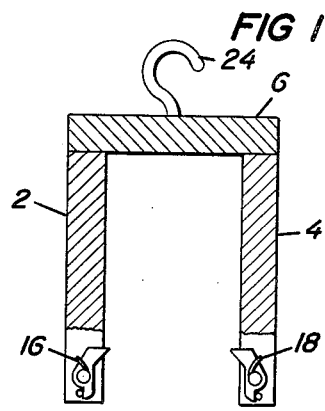
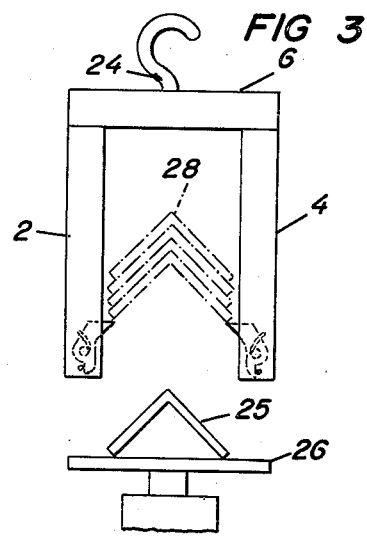
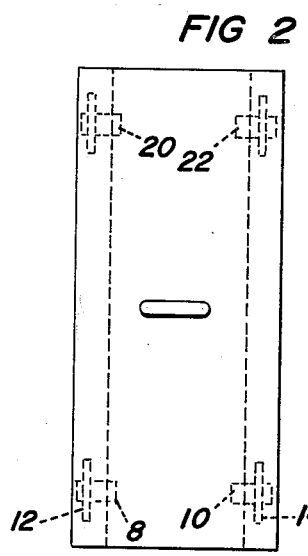
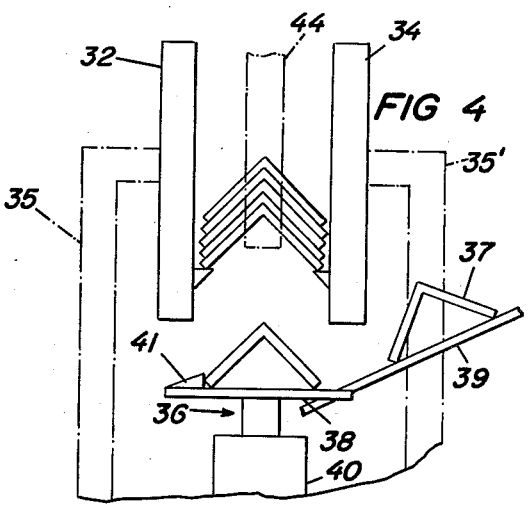
Arne Johan Breivik
INVENTOR
BY *Wenderoth, Lind & Ponack*
ATTORNEYS Nov. 26, 1963 A. J. BREIVIK 3,112,038
METHOD AND APPARATUS FOR STACKING, HANDLING AND
BUNDLING ROD-SHAPED MATERIALS, ESPECIALLY
STRUCTURAL STEEL SHAPES
Filed Sept. 13, 1960 2 Sheets-Sheet 2
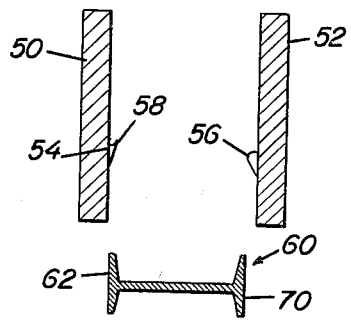
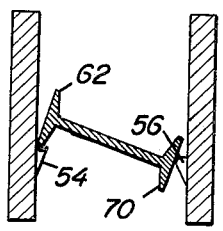
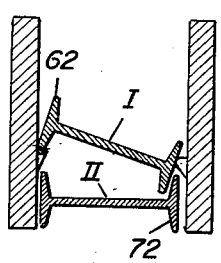
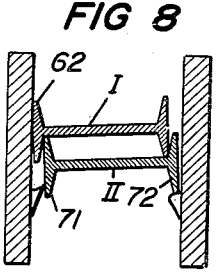
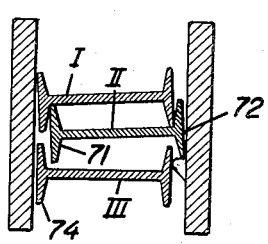
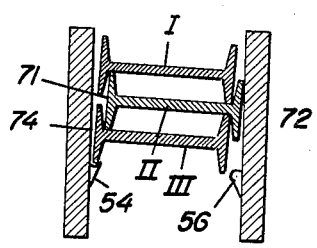
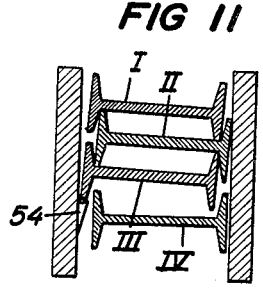
Arne Johan Breivik
INVENTOR
BY Wenderoth, Lind & Ponack
ATTORNEYS

United States Patent Office 3,112,038
Patented Nov. 26, 1963

3,112,038
METHOD AND APPARATUS FOR STACKING, HANDLING AND BUNDLING ROD-SHAPED MATERIALS, ESPECIALLY STRUCTURAL STEEL SHAPES
Arne Johan Breivik, Grimlund, Stakkevold, Tromsoya, Norway, assignor to A/S Norsk Jernverk, Oslo, Norway
Filed Sept. 13, 1960, Ser. No. 55,666
Claims priority, application Norway Sept. 15, 1959
1 Claim. (Cl. 214—6)

The present invention relates to a process and an apparatus for the stacking, handling and bundling of rod-shaped materials, especially structural steel shapes.

The invention will be particularly useful in industries which produce rod-shaped materials, and it will be described in connection with industrial production of structural steel, but it is to be understood that it with corresponding advantages can be used in the storage, transport and general distribution of goods handled on a commercial scale.

In the industry, when the finished shapes leave the last processing machine in the production line, the shapes must be carried away for storage or dispatch. This is effected in various ways. Small shapes are stacked in bundles more or less manually and transported to desired destination. Heavier shapes are as a rule stacked one by one by hand or by means of cranes.

The stacking, storage and dispatch of shapes of L-shapes, U-shapes, I-shapes or other shapes cause a number of special problems, as such sections as a rule must be stacked in a specific way, in order that the stack may get a firm and, as far as possible, compact form. With sections of small diameter the stacking can be performed manually, but if the sections are of a heavier type, it will readily be understood that both stacking and transport can be very complicated. To facilitate transport the sections are, for instance, encircled with steel bands, after a suitable number have been stacked, the bundle thus formed being then either stored or dispatched in this condition. It is usual and necessary in industry to store the finished products near the place of production, so that the running production can be stored there until dispatch to some other place is desired.

It is obvious that with increased production capacity in the productive machinery, the working capacity of the devices employed to carry away and store the products must increase correspondingly, if these are not to form a "bottleneck" in the production.

The principal aim of the present invention is to provide a method and an apparatus for mechanizing the stacking, handling and bundling of rod-shaped materials, especially structural steel, in order that these operations can proceed both automatically and with sufficient speed, and the invention is generally characterized by the fact that the rod-shaped goods, structural shapes, etc., being positioned with their longitudinal axis in the main in horizontal position, preferably one by one, are moved from below into a downwardly opening stacking space with approximately vertical walls, the section to be stacked being introduced into the space in such a way that it comes to rest against the underside of the section or the lowest of the sections which already lies in the pocket, and pushes it or these farther upwards into the pocket, there being provided in the sides of the pocket moveable pawls which hold the sections already in the pocket, but permit the introduction of one or more new sections into the pocket.

Further advantages and features of the invention will become apparent from the following description in connection with the attached drawings, in which FIG. 1 is a diagrammatic elevation, partly in section, of an apparatus which schematically illustrates how the method according to the invention can be effected.

FIG. 2 is a sectional plan view of the apparatus shown in FIG. 1.

FIG. 3 is a sectional view similar to FIG. 1, which illustrates how the method can be used for the stacking of angular shapes.

FIG. 4 is an elevation similar to FIG. 1, of a modified embodiment of an apparatus for the stacking of angular steel shapes.

FIGS. 5–11 are sectional elevations illustrating how the method according to the invention can be employed for stacking I-shapes which, due to their specific cross-section preferably should be stacked in displaced relation to one another.

It is to be understood that when the word "wall" is used in the following description, this word shall also include other rigid, plane structures, such for example several stiff elements firmly fitted in the same plane as a frame.

In FIGS. 1 and 2, reference numbers 2 and 4 denote two substantially vertical, parallelly spaced walls, which are arranged parallel and fixed relative to each other by means of a bracing 6, which is suitably fastened at the upper end of each of the walls 2 and 4. Toward the lower end, on the inside of each of the walls 2 and 4, there are fitted pawls, facing one another in pairs, and which are pivotal on journals 12 and 14. The pawls are thus moveable in such way that they normally point into the chamber between the walls, for example by being spring-loaded by spiral springs 16 and 18, in such manner that they can be pressed into the walls in alignment with these. As will appear most clearly from FIG. 2, a first pair of pawls, 8, 10 is fitted, as described above, toward one side-opening of the walls, whilst another identical pair of pawls 20, 22 is fitted toward the opposite side-opening of the walls. All the pawls are fitted in the same horizontal plane.

24 is a hoisting hook fitted on to the top of the bracing 6 above the centre of gravity of the device described, in such manner that one may lift the device by the hook without causing any rocking of the device.

FIG. 3 shows how the method of stacking according to the invention can be effected. The apparatus in the form of the embodiment described is designed for the stacking of angles with equal legs, which are to be stacked in such way that the legs point downwards at an angle of 45°. The angle 24 is placed horizontally on a trestle 26 which is so devised that it does not interfere with the walls 2 and 4, when these are lowered over the angle. In doing this, all the pawls are pressed into the walls 2 and 4 when the angle edges pass same, whereafter the pawls return to their normal outer position. When now raising the apparatus, the angle will rest on to the pawls 8 and 10, and is thus kept in position between the walls. Then a new angle can be placed directly under the opening between the walls, whereupon these are again lowered. The first angle which already is carried by the apparatus will now be pushed upwards by the second angle, simultaneously as the pawls are pressed into the walls, whereafter the apparatus again may be raised in such manner resulting in that the two angles rest on top of each other, the lower one resting on the pawls. Thus, by successively lowering and raising the apparatus over the angles placed underneath it becomes possible to effect that these be stacked in the pocket between the walls (forming a stack), as indicated by dotted lines 28.

Instead of lowering the walls across the structural shapes these can, of course, be moved or pushed in upward direction in between the walls. A modification of an apparatus for carrying out the method according to the invention is shown in FIG. 4. In this the walls 32 and 34 are devised in connection with a support (shown by dotted lines 35 and 35') which is fixed to the floor. 36 is a hoisting device, including a suitable table 38, which can be moved vertically by means, for example, of an hydraulic jack 40. The stacking apparatus can be arranged in connection with a straightening machine, from which a section 37 can be moved down a slope 39 down on to the table 38 where it is caused by means of a suitable stopping device 41 to halt directly below the opening between the walls. By employing an apparatus according to the invention it is thus possible to build up a stack of the desired height between the walls 2, 4 and 32, 34, which stack then, if desired, can be wrapped around with wires or the like forming bundles suitable for transportation.

As will be seen from FIG. 4, the walls or pocket in this embodiment is open at the upper end, so that the stack or bundle can be removed from the apparatus by being lifted directly out of this. This can be performed by means of a hoisting device 44 or by means of a device such as is shown in FIGS. 1 and 2. In such case the walls 2, 4 and 32, 34 preferably are executed in the form of equally spaced, parallel, vertical standards, and where an apparatus according to FIG. 1 is lowered "into" the apparatus according to FIG. 4, during which operation the pawls 8 and 10 are pushed in by the stack until the entire stack which is pre-stacked in the apparatus shown in FIG. 4 is situated above the pawls 8 and 10, after which the entire stack can be lifted out and conveyed to any desired place. The stack or bundle is preferably removed from the pocket by transferring the weight of the stack to an auxiliary support, whereafter the pawls are brought flush with the walls, either manually or, more practically, by means of suitable electromagnetic trippers, the construction of which is well known and needs no detailed description.

The distance between the walls in the apparatus, as well as the shape of the pawls, must, as will be understood, conform to the various structural shapes which are in question.

FIGS. 5–11 are schematic sectional views which successively illustrate how lengths of double-flanged I-sections can be stacked in a stable and compact way, and since the apparatus as well as the method in this modification of the invention differs somewhat from the one described above, it shall be described in detail.

In the figures, 50 and 52 denote two vertical walls, which are parallelly situated at a fixed distance from each other and which define a stacking space between them. In the walls are arranged two or more pairs of pawls 54 and 56, normally pointing into the space between the walls, but which pawls are spring biased toward each other so they can be pressed flush with the walls. One of the pawls, 54, is made in such a way that it forms a hook, and it is to be understood that two or more pairs of pawls identical with 54 and 56 are arranged in the walls at the same elevation at a certain distance from each other. 60 is a double-flanged I-section of steel placed directly underneath the opening between the walls and lengthwise to these. The section 60 is raised (or the walls lowered) in this position straight up between the walls until it is above the pawls, whereafter it is moved sideways such that the flange 62 is flush with wall 50 provided with the hook-shaped pawl 58, and then lowered, such that flange 62 comes to rest against the hook 58, resulting in that the section now tilts until the other flange 70 strikes against the pawl 56 and/or the wall 52, and comes to rest in an inclined position as shown in FIG. 6.

The second section which is to be stacked is now lifted up into the stacking space. As will appear from FIG. 7, the right flange 72 on section No. II will slide along the outside of section No. I, by reason of the inclined resting position of section No. I and because of the fact that the left flange 62 on section No. I rests in the hook-shaped pawl 54, so that this pawl, as will be seen from the figure, cannot be pressed in against the wall, but on the contrary will cause section No. II to be pushed over toward the right side of the stacking space. In the course of the continued raising of section No. II section No. I will come to rest against section No. II in overlapping fashion, i.e. the corresponding flanges will contact each other. Thus the walls defining the stacking space must be so arranged that the distance between the walls is greater than the distance from the outside of an external flange on one length to the outside of the opposite external flange on an adjoining length. When the two sections together are lowered, the right external flange 72 will come to rest against the pawl 56. Sections I and II will then swing about pawl 56 until the external flange 62 on the overlapping section meets the wall 50. It will thus be seen that the walls must be spaced from each other a distance which is less than the maximum cross-sectional dimension of the stacked sections I and II.

As will appear from FIG. 8, the two sections will, presuming that the dimensions are correctly adapted, be kept in static equilibrium in the stacking space in this position, without the help of the pawl 54, lateral components of force being transferred to the walls through the two sections lying therein.

FIG. 9 shows the situation when a third section is introduced into the stacking space. This will, when it strikes against pawls 54 and 56, be pressed over toward the left side wall, as the pawl 56 is loaded by a weight and difficult to move, while the pawl 58 is free and will be easily pressed in flush with the wall. If it is found desirable, the pawls can be so constructed that the pawl 56 during the introduction of the third section can not only be loaded by a weight, but can be locked in position, like the pawl 54 during the introduction of section No. II. Section No. III will consequently be moved upwards along the wall 50, with the effect that the left flange 74 will be positioned on the outside of the flange 71 on section No. II, which rests on the pawl 56. When now the three sections are raised simultaneously until section No. III is above the pawls, and they are then lowered, flange 74 on section III will come to rest against pawl 54 and the sections will swing together against the wall 52, the external flange 72 on section No. II lying then against the wall in resting position. See FIG. 10.

FIG. 11 shows the situation when a fourth section is lifted up into the stacking space. This will be forced over toward the right wall, as pawl 54 is loaded, while pawl 56 can be swung in flush with the wall.

The shape and execution of the pawls may of course be varied within the scope of their function, which is to block the lower end of the stacking space and thus to keep the sections in position after these have been able without hindrance to pass the level of the pawls when they move relative to the pawls in the upward direction. In the case of I-, U- and similar shaped sections the pawls are intended in addition to push the sections forwards relative to one another.

It will be understood that by the procedure and the apparatus described above it is possible to stack any desired number of double-flanged sections in the stacking space, so that these are alternately pushed to the right and to the left wall in relation to one another.

As described earlier in connection with angular sections, it will be understood that it is per se without significance whether it is the wall which moves downwards over the sections or the sections which move upwards for the purpose of forming the stack.

The method and the apparatuses for stacking according to the invention can, as already stated, be used for a number of different purposes. In the above there have been described some embodiments of apparatuses whereby the method according to the invention can be carried into execution. It will be understood by persons skilled in the art that further modifications of apparatuses can be devised, whereby any type of structural shapes can be stacked. It seems unnecessary to describe each single modification of such apparatuses, the invention being only limited in conformity with the following claim.

I claim:

Apparatus for stacking lengths of materials having a substantially horizontal web and substantially vertical flanges on the lateral edges of said web, said apparatus comprising a stacking member having spaced opposed walls defining between them a downwardly opening stacking space, said walls having pawls therein extending into said stacking space at opposed positions on said walls, the said walls defining said stacking space being spaced from each other a distance greater than the total horizontal cross-sectional dimension of two of the lengths of material to be stacked when said lengths are stacked one upon the other in overlapping fashion with the corresponding flanges on the lengths contacting each other, and said walls being spaced from each other a distance less than the maximum cross-sectional dimension of the thus stacked lengths, and one of said pawls being upwardly turned in a hook and the other of said pawls being rounded off on the end, and said pawls being spring biased toward each other, whereby when the lengths are inserted one by one into the stacking space they will be automatically stacked in alternate overlapping fashion.

References Cited in the file of this patent

UNITED STATES PATENTS

| | | |
|---|---|---|
| 1,538,851 | Goss | May 19, 1925 |
| 2,648,181 | Dalton | Aug. 11, 1953 |
| 2,744,369 | Seragnoli | May 8, 1956 |

FOREIGN PATENTS

| | | |
|---|---|---|
| 187,767 | Germany | July 4, 1907 |